(12) United States Patent
Poltorak (10) Patent No.: US 7,158,116 B2
(45) Date of Patent: Jan. 2, 2007

(54) RECHARGEABLE CORDLESS INPUT AND POINTING DEVICE

(75) Inventor: Alexander I. Poltorak, Monsey, NY (US)

(73) Assignee: DRB Institute LLC, Wilmington, DE (US)

( * ) Notice: Subject to any disclaimer, the term of this patent is extended or adjusted under 35 U.S.C. 154(b) by 450 days.

(21) Appl. No.: 10/407,402

(22) Filed: Apr. 4, 2003

(65) Prior Publication Data

US 2004/0196262 A1    Oct. 7, 2004

(51) Int. Cl.
*G09G 5/00*    (2006.01)

(52) U.S. Cl. ...................................... 345/158; 345/163

(58) Field of Classification Search ................ 345/163, 345/157, 158, 161, 184, 167, 166; 250/221; 341/31; 178/18.01; 715/857
See application file for complete search history.

(56) References Cited

U.S. PATENT DOCUMENTS

| | | | |
|---|---|---|---|
| 2,661,591 A | 12/1953 | Thiebaude | |
| 2,867,971 A | 1/1959 | Bertsch et al. | |
| 2,981,055 A | 4/1961 | Froidevaux et al. | |
| 3,306,025 A | 2/1967 | Kocher et al. | |
| 6,198,473 B1 * | 3/2001 | Armstrong | 345/163 |
| 6,445,379 B1 | 9/2002 | Liu et al. | |
| 6,453,155 B1 * | 9/2002 | Hill et al. | 455/90.1 |
| 6,485,172 B1 | 11/2002 | Takahashi et al. | |
| 6,686,903 B1 | 2/2004 | Peng | |
| 6,756,700 B1 * | 6/2004 | Zeng | 307/112 |
| 6,809,722 B1 * | 10/2004 | Mei et al. | 345/163 |
| 6,850,224 B1 * | 2/2005 | Baughman | 345/163 |
| 6,903,725 B1 | 6/2005 | Nacson | |
| 6,924,486 B1 * | 8/2005 | Schick et al. | 250/370.08 |
| 2002/0118173 A1 | 8/2002 | Nacson | |
| 2003/0080938 A1 | 5/2003 | Lian et al. | |
| 2004/0023680 A1 | 2/2004 | Hulvey | |

FOREIGN PATENT DOCUMENTS

| | | | |
|---|---|---|---|
| GB | 2314470 A | | 12/1997 |
| JP | 10-283079 | * | 10/1998 |
| JP | 10283079 A | | 10/1998 |

* cited by examiner

*Primary Examiner*—Richard Hjerpe
*Assistant Examiner*—Abbas Abdulselam
(74) *Attorney, Agent, or Firm*—Milde & Hoffberg, LLP (57) ABSTRACT

A wireless pointing device, such as a computer mouse, employs self-generated electric energy to power itself and to recharge its internal energy cell. The self-generated power may come from a flywheel coupled to a generator, from a photovoltaic cell, from a secondary coil inductively coupled to an alternating current-powered primary coil in a mouse pad, or from another source. The mouse can also include a movement detector for indicating when the mouse is in use. When the mouse is not in use for a predefined time period, the mouse turns itself off, or enters a low power consumption state, to conserve the energy stored in its internal energy cell.

60 Claims, 10 Drawing Sheets

RECHARGEABLE CORDLESS INPUT AND POINTING DEVICE

REFERENCE TO RELATED DISCLOSURE DOCUMENT

This application is related to Disclosure Document Number 491608, titled Method and Apparatus for Recharging Computer Pointing Device, filed on 5 Apr. 2001.

BACKGROUND OF THE INVENTION

1. Field of the Invention

The present invention relates generally to input and pointing devices for data processing systems, and, more particularly, to cordless input and pointing devices such as mice, trackballs, computer pens, joysticks, and keyboards.

2. Background

With the advent of the information revolution, computers have found their way to most desks, be it in the office or at home. For the better part of the last two decades, most programs run by computers have been employing graphical user interfaces (GUIs) for inputting a substantial part of user-generated data and controls into the computers. Graphical user interfaces rely heavily on pointing devices—such as mice, trackballs, and touch pads—for most functions. For example, a computer operator can move a cursor on a computer display by manipulating the pointing device. Manipulation of the pointing device depends on the nature of the device. In case of a mouse, manipulation means sliding the mouse across a surface, such as a mouse pad. When the pointing device is a trackball, manipulation means rotating its ball in different directions. Finger-actuated buttons (switches) are typically provided on a pointing device for "clicking," i.e., for selecting particular areas of the display, to cause the computer to perform the functions associated with the icons displayed in these areas.

A pointing device may be built into its host computer. More commonly, a pointing device is a device that is physically separate from its host computer. In the latter case, various methods can be employed to connect the pointing device to the computer through a cable. For example, the pointing device may plug into a standard RS 232 serial port of the computer through a serial cable. In another example, the pointing device may plug into a standard Universal Serial Bus (USB) port of the computer through a USB cable. Alternatively, the pointing device may plug into a proprietary interface port of the computer through a compatible proprietary cable. The cable connecting the pointing device to the host computer generally serves two purposes. First, it provides a link for the flow of data describing movements (manipulations) of the pointing device to the host computer. Second, the cable carries the electrical power necessary for the operation of the pointing device.

Cable connections between pointing devices and their corresponding host computers have a number of disadvantages. They add to the tangled webs of cables underneath a typical computer user's desk. They also limit the distance between a pointing device and a computer. And, of course, the extra cable on the desk adds to the clutter. Moreover, a cable used in one computer setup might not fit another setup. For example, a cable used to connect a mouse to a laptop (or notebook) computer—generally about two feet in length—will likely be too short for a desktop computer application. Thus, a computer user may need multiple pointing devices.

A cordless mouse obviates the inconveniences of the corded mouse: there is no need for a cord of any length, because a cordless mouse connects to the computer through a wireless link. The wireless link can be, for example, a radio frequency (RF) link, an optical link, an infrared link, or even an ultrasound link. Whatever the nature of this link, it enables a one- or two-way flow of data between the host computer and the mouse.

Recall, however, that the mouse cable serves two functions: (1) enabling the flow of data, and (2) supplying electrical power to the mouse. The wireless link can readily enable the flow of data, thereby fulfilling the first function, but it is not at all apparent how the wireless link can practically supply the electrical power to the mouse. The common solution in the art of wireless pointing devices is to provide a primary or secondary (rechargeable) cell within the wireless mouse to furnish the electrical power needed to operate the mouse. Thus, both functions formerly performed by a connecting cable are fulfilled in a wireless mouse. Unfortunately, this solution is not without its own deficiencies.

Of the two kinds of cells, that is primary and rechargeable, the latter appears to be a more economical and popular choice for cordless mice. In one implementation marketed under the name of GyroMouse, a cordless mouse can be used with a mouse pad, or it may be held in hand and used as a pointing device. The mouse uses rechargeable batteries, and needs to be placed in a special charging cradle for recharging.

With users who purchased a wireless rechargeable mouse with a charging cradle, forgetting to place the mouse in the cradle when leaving the office in the evening becomes a frequent event. When left outside the charging cradle, the mouse completely discharges overnight. Thus, the following morning the mouse has to be recharged before it can be used. Because placing the mouse in the charging cradle renders it inoperable as a pointing device, the mouse is useless while being recharged. Therefore, recharging, which typically takes several hours, renders the mouse useless during a significant portion of the following day. This nuisance leads many users to discontinue the use of the cordless mouse.

The charging problem disappears in the case of a mouse powered by primary cells, or by removable secondary cells. The frequent effort and expense necessitated by the need to replace the cells, however, do not make the use of replaceable cells a viable solution for many people.

Several attempts have been made to improve on the state of the art of wireless mice. For example, electrical power for a wireless mouse can be generated from the rotational motion of the ball of the mouse when the mouse slides across a surface.

In accordance with another attempt to improve on the art, an RF transmitter and a primary antenna are built into a mouse pad. The wireless mouse includes a secondary antenna for receiving the RF energy radiated by the primary antenna of the mouse pad. The RF energy thus received is converted into electrical energy for operating the wireless mouse. The host computer supplies the energy for the RF transmitter of the mouse pad.

Information relevant to attempts to improve on the art of wireless mice can also be found in U.S. Patent Application No. 20020118173; in Japanese Patent Application No. JP10283079; and in U.S. Pat. No. 6,445,379, issued to Liu et al. Although detailed analyses of the attempts described above are beyond the scope of the present document, each suffers from one or more of the following disadvantages:

Where the electrical energy for the operation of a mouse is derived from the mechanical movement of the mouse, it appears that excessive physical effort would be required to move the mouse in order to generate sufficient electrical power. Among other disadvantages, this approach is not at all applicable to optical devices, which are rapidly replacing the old ball-based mouse in popularity, and which have no ball to drive the generator that charges the battery.

As regards the method for coupling RF energy from a mouse pad to a wireless mouse, two speculative observations can be made. First, the efficiency of this method is quite low, because only a small portion of the radiated RF energy will be captured and used by the wireless mouse. Thus, the power drain from the host computer would be relatively high. Second, the deliberate radiation of RF energy might create unacceptable electromagnetic interference and, perhaps, alarm some health-conscious consumers.

A need thus exists for a pointing device with reduced power consumption characteristics during periods of nonuse. A further need exists for a pointing device that self-charges during the periods of its use as well as the periods of nonuse. Still another need exists for a pointing device that can be operated while being charged, or that can be operated without the need for a charged cell, and that overcomes the shortcomings of existing technologies.

SUMMARY

The present invention is directed to apparatus that satisfies these needs. The invention herein disclosed is a pointing device, such as a computer mouse, a trackball, a computer pen, or a joystick. The mouse has a movement detector for generating signals in response to the manipulations of the pointing device, e.g., movements of a mouse or rotation of a trackball, and a controller that receives the signals from the movement detector and prepares the signals for transmission to a host computer. The computer can respond, for example, by moving its cursor in accordance with the movements of the mouse. The controller hands over the signals to a wireless transmitter, for example, an RF or an infrared transmitter. The pointing device can also have a switching block with one or more switches operated by buttons. The controller is connected to the switching block to sense the state of the switches, and generates clicking signals corresponding to the changes in the states of the switches. The controller then hands the clicking signals to the transmitter. The transmitter sends the signals prepared by the controller from the signals generated by the movement detector and the clicking signals to the host computer through the mouse's antenna or an optical transmitter.

A primary, rechargeable, or fuel energy cell powers the mouse. In addition, power for the operation of the mouse can be self-generated. One technique for self-generating the power is by using a photovoltaic element disposed either on the outer shell of the mouse, or under the shell. In the latter case, the shell is transparent so that the photovoltaic element can generate electrical energy.

Another technique for self-generating the power is by converting the mechanical (kinetic) energy of motion into electric power. In this embodiment, the flying wheel (similar to one used in automatic self-winding watches) is connected to a generator that converts kinetic energy into electrical power used to recharge the cell in the pointing device.

Another technique for self-generating the power is by inducing a variable magnetic field by driving a primary coil in the mouse's pad. The primary coil can be driven by an AC source external to the pad, or the pad can include an oscillator and a driver for generating the AC driving current from a DC source. The mouse includes a secondary coil inductively coupled to the primary coil, so that the time-varying magnetic field generated by the primary coil induces an AC potential at the terminals of the secondary coil. The AC potential of the secondary coil is rectified, filtered, and regulated to provide a source of self-generated power for the mouse.

In some embodiments, the cell is a secondary cell recharged by the self-generated power. A power controller handles the task of charging the cell. In addition, the power controller handles the tasks of receiving the self-generated power and the power available from the cell, and distributing the power to the active components of the mouse. The active components can include, for example, the controller, the transmitter, and the movement detector.

Moreover, some embodiments of the pointing device can be put into an OFF or a low power state. Here, a particular pointing devices includes an activity detector for determining when the pointing device is being used, for example, touched or moved, and a state controller for causing the mouse to enter into active and low power (or OFF) states. When the pointing device is not used for a predetermined period of time, the state controller's timer expires, and the state controller causes the pointing device to become inactive (turn itself OFF) or enter into a low power state. When the activity detector senses that the mouse is being used, it causes the pointing device to enter into the active state, and restarts the timer. Each indication of activity restarts the timer.

These and other features and aspects of the present invention will be better understood with reference to the following description and appended claims.

DETAILED DESCRIPTION

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale. For purposes of convenience and clarity only, directional terms, such as, top, bottom, left, right, up, down, over, above, below, beneath, rear, and front, are used with respect to the accompanying drawings. These and similar directional terms should not be construed to limit the scope of the invention in any manner. In addition, the words "wireless" and "cordless" are used interchangeably, unless the difference is noted or made otherwise clear from the context.

Figure 1:
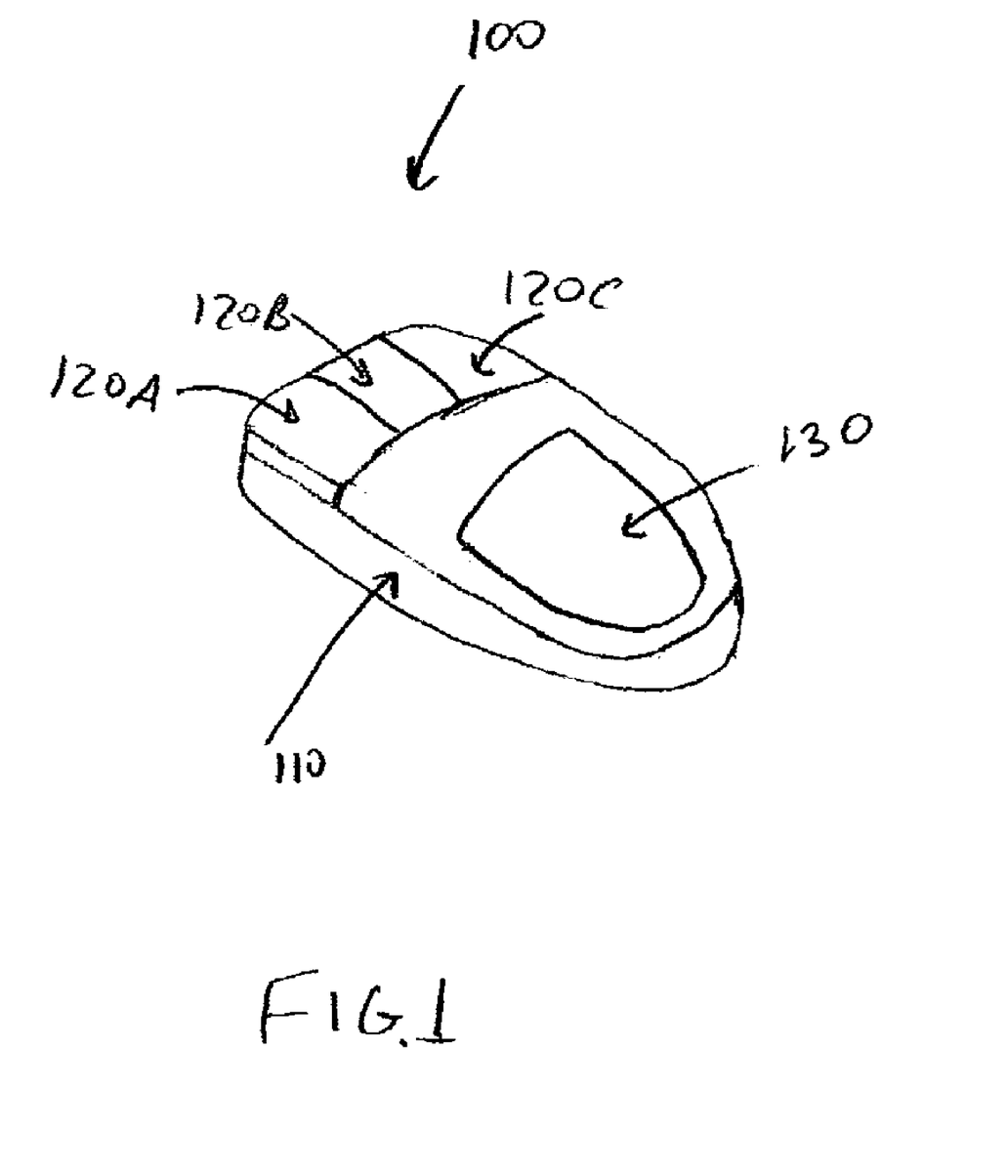
FIG. 1 is a perspective view of a wireless mouse with a photovoltaic cell, in accordance with the present invention.
Figure 2:
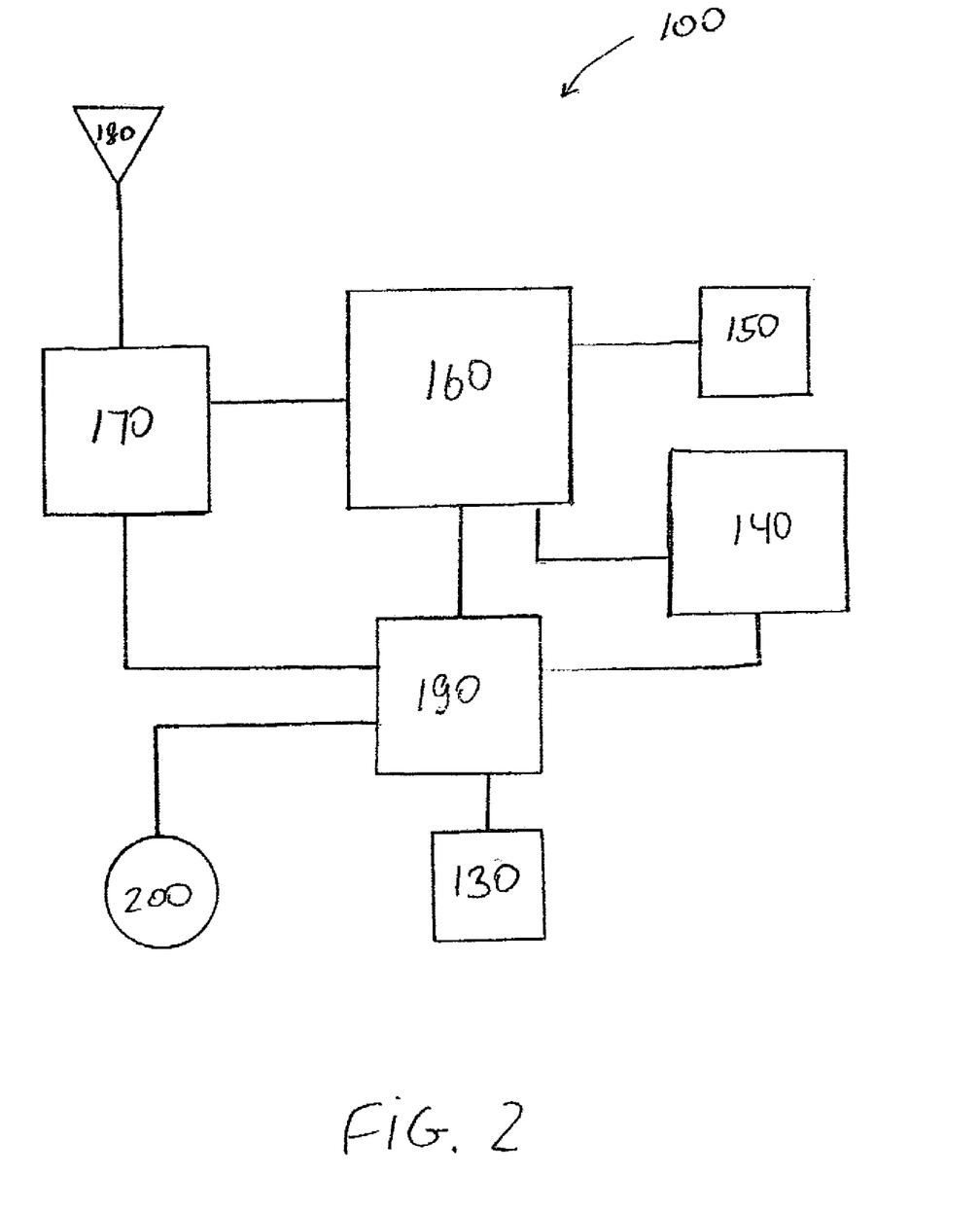
FIG. 2 is a simplified schematic diagram of a wireless mouse with a photovoltaic cell, in accordance with the present invention.

Referring more particularly to the drawings, FIGS. 1 and 2 illustrate a wireless mouse embodiment 100 in accordance with the present invention. FIG. 1 is a perspective view of the mouse 100, and FIG. 2 is a simplified schematic diagram of the mouse 100. Outer shell 110 of the mouse 100 includes openings to accommodate activation buttons 120A, 120B, and 120C. In the illustrated embodiment, a portion of the shell 110 is covered by one or more photovoltaic elements 130 that generate electricity from the energy of the light incident upon them. More generally, all or any part of the surfaces of the shell 110 and of the buttons 120A, 120B, and 120C can be covered by the elements 130. Moreover, the elements 130 can be positioned under the shell 130, if the shell 130 is transparent to some part of the electromagnetic spectrum from which the elements 130 can generate electrical energy.

The major functional blocks of the mouse 100 appear in FIG. 2. Movement detector 140 detects movements of the mouse 100 and converts the detected movements into electrical signals. Similarly, the button switches assembly 150 detects actuations, i.e., clicking, of the buttons 120 and converts them into electrical signals. Main controller 160 receives the signals generated by the movement detector 140 and the button switches assembly 150, encodes the received signals, and prepares them for transmission to the host computer (not shown in the Figures). Then, the main controller hands the encoded signals to the transmitter (or transceiver) block 170 for transmission through antenna 180.

The antenna 180 can be an RF antenna; it can also be any other radiator for use with the transmitter 170. For example, the antenna can be an optical, infrared or ultrasound radiator.

Power for the operation of the mouse 100 comes from power control and charging circuit 190, cell 200, and photovoltaic element 130. The cell 200 is the main energy storage component of the mouse 100. It may be a rechargeable cell, recharged by the circuit 190 from the electrical energy generated by the photovoltaic element 130. A second, supplemental source of external energy for recharging the cell 200 may also be built into the mouse. This second source, which is not illustrated, can be a charging cradle interface.

The cell 200 can also be a primary, non-rechargeable cell. In this case, the electrical energy generated by the photovoltaic element 130 serves to supply additional power to the mouse and extend the life of the cell 200 by reducing the load thereon.

The circuit 190 controls the charging of the cell 200 and the distribution of the electrical power to other functional blocks of the mouse 100.

The photovoltaic element 130 is a device capable of generating electricity from visible light, or from any other part of the electromagnetic spectrum that is available for this purpose, e.g., from infrared radiation.

In the illustrated embodiment, the motion detector 140 is implemented as an arrangement of a ball and orthogonal rollers, with an encoding mechanism. The motion detector 140 can also be selected from a broad array of other movement sensing technologies, such as electrooptical or purely optical sensors, that are known to a person skilled in the art of designing pointing devices.

The button switches assembly 150 holds miniature switches or other pressure sensors.

The block 170 is a transmitter implementing the functions of the wireless link that enables the mouse 100 to communicate with the host computer. Optionally, the block 170 is a transceiver providing a capability for bi-directional communications between the mouse 100 and the host computer. The receiving function of the block 170 can be used, for example, to enable the host computer to direct the control block 160 and the circuit 190 to customize the mouse operations (e.g., change the sensitivity to movement, change the velocity of a cursor or rewire the buttons 120 for right- or left-handed operator), to initiate self-testing, to perform cell maintenance (deep discharge) procedures, or to report the status of the cell 200 to the host computer. The block 170 can be implemented, for example, as an RF, optical, infrared, or ultrasound transmitter or transceiver.

In the mouse 100, the main controller 160 is a state machine, however implemented. In one embodiment, the main controller 160 is a low-power CMOS microcontroller under program control.

Note that the delineations between functional blocks shown in FIG. 2 (and in other block diagrams of this document) are there for convenience and ease of description only. In many possible implementations of the pointing devices described herein, the distinctions between the blocks blur, and several blocks can be built on the same hardware platform. For example, the microcontroller of the main controller 160 can be used to perform many or all of the functions of the power controller and charging circuit 190. As another example, the hardware functions of the main controller 160 and the transmitter block 170 can be combined on the same integrated circuit. Also note that some blocks can represent or include software processes.

Figure 3:
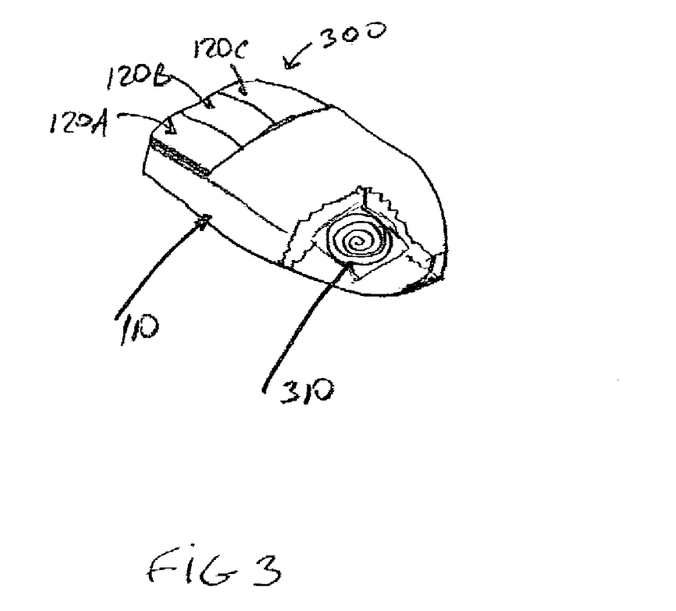
FIG. 3 is a perspective view of a mouse with an inductively coupled power source, and of a mouse pad capable of powering the mouse, each in accordance with the present invention.
Figure 4:
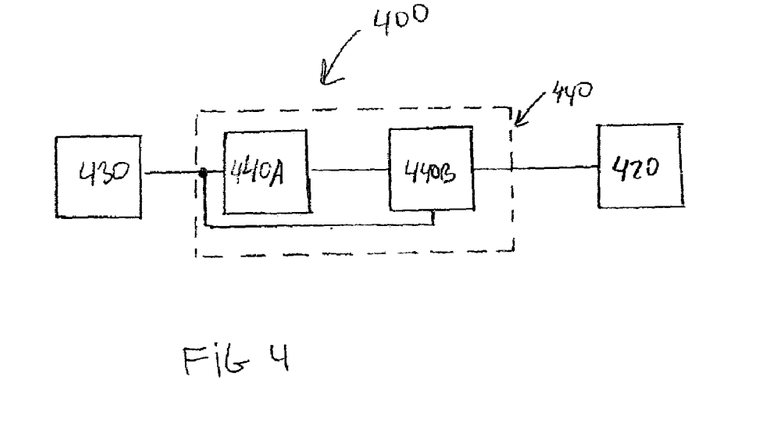
FIG. 4 is a simplified schematic diagram of the mouse and the mouse pad of FIG. 3.

Another embodiment of a pointing device in accordance with the present invention is illustrated in FIGS. 3 and 4. FIG. 3 shows a mouse 300 and a special mouse pad 400 in perspective, with cutouts to show portions of internal structure. FIG. 4 is a simplified schematic diagram of the mouse 300 and the pad 400. In this embodiment, the electrical power for operation of the mouse 300 is inductively coupled into the mouse 300 from the mouse pad 400.

The mouse pad 400 has a base 410. A primary inductive coil 420 is embedded into the base 410. In this embodiment, the base 410 is made from a flexible material, with the top surface of the base being adapted for sliding the mouse 300 thereon. The bottom surface of the base 410 is more textured, so as to increase the friction between the mouse pad 400 and the surface upon which the mouse pad 400 rests. A primary inductive coil 420 is molded into the base 410.

Direct current electrical power is coupled to the pad 400 through a connector 430 from a cord 450. The cord 450 may plug into a power supply connector of the host computer (not illustrated), or to an independent power supply (also not illustrated). Electronic module 440 converts the received power to alternating current and drives the primary inductive coil 420 with the alternating current. The module 440 includes an oscillator circuit 440A and a driver circuit 440B. These two circuits can be readily combined into a single unit.

The precise frequency of the oscillator 440A is not critical, because inductive coupling can take place over a very broad range of frequencies. One consideration in choosing the appropriate frequency is minimization of radiation loses. Frequencies between about 30 Hz and about 100 kHz have been found to work well for the instant purpose.

Alternating current can also be used to power the mouse pad 400. In this case, the module 400 can be either dispensed with entirely, or it can be simplified. In one embodiment, a transformer plugged into a conventional alternating current (AC) outlet powers the mouse pad 400.

The precise frequency of the oscillator 440A is not critical, because inductive coupling can take place over a very broad range of frequencies. One consideration in choosing the appropriate frequency is minimization of radiation loses. Frequencies between about 30 Hz and about 100 kHz would work well for the instant purpose.

When the mouse 300 is placed on the pad 400, the low frequency magnetic fields produced by the primary inductive coil 420 induce electromotive force in the secondary coil 310. The power conditioner 320 rectifies, filters, and regulates the AC power at the output terminals of the secondary coil 310, and sends the conditioned direct current (DC) power to the circuit 190. In one arrangement, the power conditioner 320 includes a 4-diode bridge for rectifying the AC power of the coil 320, a T- or Pi-shaped combination of capacitors and inductors for filtering the rectified power, and an IC regulator for producing stable, regulated DC power.

The remaining blocks of the mouse 300 function substantially in the same way as in the mouse 100.

Note that the cell 200 need not be included within the mouse, particularly where the secondary inductive coil 310 supplies continuous power.

Figure 5:
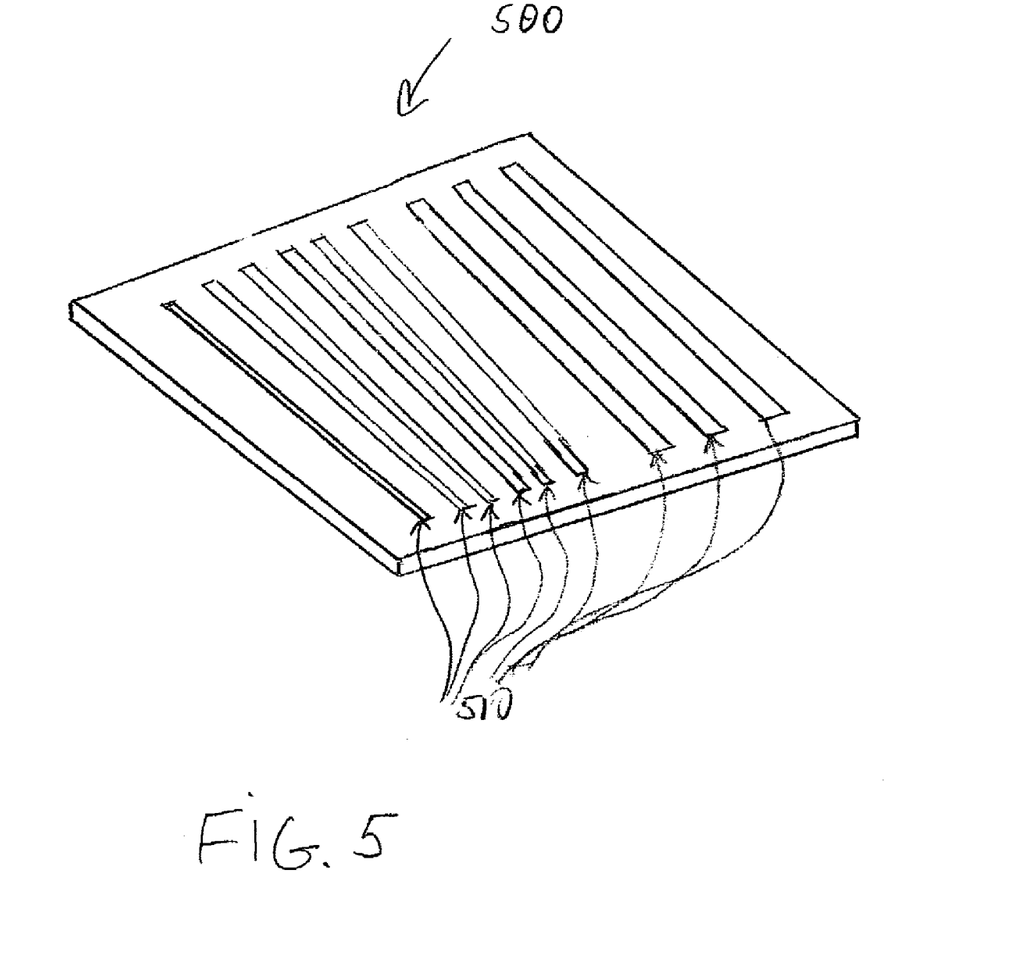
FIG. 5 illustrates a mouse pad with embedded permanent magnets for inducing electrical energy in a mouse in accordance with the present invention.

As is known in physics, electromotive force will be induced in the coil 310 when the coil 310 is moved through a stationary magnetic field. Thus, in yet another embodiment of a mouse-pad combination in accordance with the present invention, the pad contains embedded magnets, for example, magnetic strips, magnetic wires, or otherwise shaped magnetic elements. FIG. 5 illustrates such a pad 500 with magnetic strips 510. In the mouse pad 500, the magnetic strips 510 are substantially parallel and evenly spaced. Thus, movement of the mouse 300 over the pad 500 generates electrical power for the operation of the mouse 300, even in the absence of the primary inductive coil 420 and its driving circuits.

In still another embodiment of a pointing device in accordance with the present invention, electrical power is generated from kinetic energy of the device's motion. In an exemplary embodiment illustrated in FIG. 5A, a pointing device 550 has a generator 560 driven by a kinetic energy converter 570. The kinetic energy converter can be a mechanism similar to those used in self-winding watches.

Figure 5A:
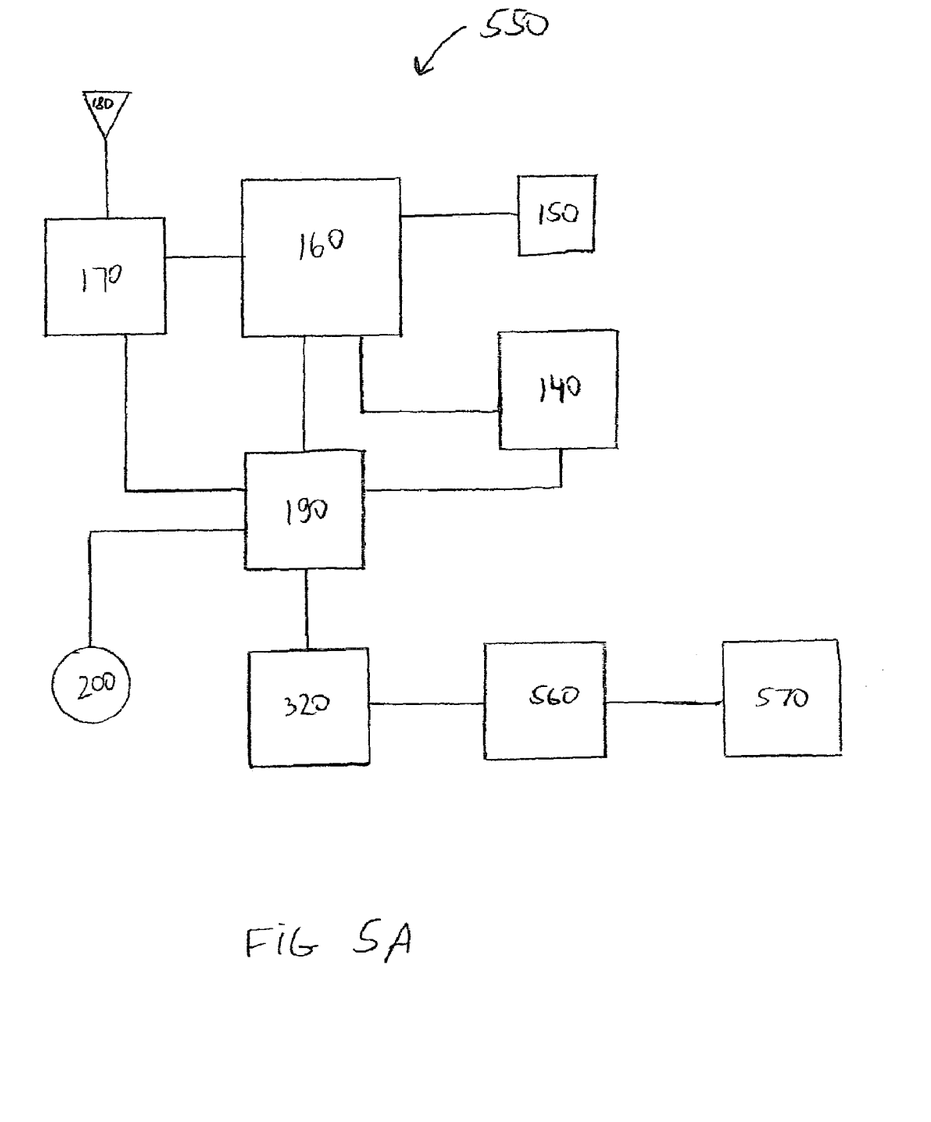
FIG. 5A is a simplified schematic diagram of a mouse with a kinetic energy converter, in accordance with the present invention.

For example, a self-winding mechanism can include a balance weight connected to the generator's shaft, so that pivotal movements of the balance weight rotate the shaft and cause the generator to generate electrical energy. The connection of the balance weight to the generator's shaft can be direct or indirect, i.e., through couplings, rocker members, and/or gears. Thus, acceleration of the pointing device having a component in a plane defined by the generator's shaft causes rotation of the shaft and generation of electrical energy for use in the pointing device. Various examples of self-winding mechanisms are described in U.S. Pat. No. 6,485,172 to Takahashi et al.; U.S. Pat. No. 3,306,025 to Kocher et al.; U.S. Pat. No. 2,981,055 to Froidevaux and Bandi; U.S. Pat. No. 2,867,971 to Bertsch et al.; and U.S. Pat. No. 2,661,591 to Thiebaude. These patents are hereby incorporated by reference as if fully set forth herein.

The generator 560 and the kinetic energy converter 570 can also be integrated in one mechanism. In one embodiment, a magnet/balance weight is held inside or in proximity of a coil by one or more springs, so that the magnet is moveable with respect to the coil. The coil is attached to the body of the pointing device. Thus, acceleration of the pointing device causes movement of the magnet with respect to the coil, thereby generating a potential difference at the coil's terminals. The terminals can be coupled to a rectifier and a power conditioner.

In another aspect, a pointing device in accordance with the present invention has the capability to put itself in an "OFF" or sleep mode after the pointing device has not being used for some predefined period of time. This technique conserves the energy of the device's cell, and it may be employed either alone or in conjunction with the self-powering features, such as those that were discussed above, i.e., a photovoltaic element, inductive coupling from the mouse pad, or a combination of a kinetic energy converter and a generator. Of course, this power conservation technique can also be employed in conjunction with other self-powering schemes, including the generation of electric power from the rotational motion of the ball of the pointing device, or capture and conversion of the RF power transmitted by a mouse pad.

Figure 6:
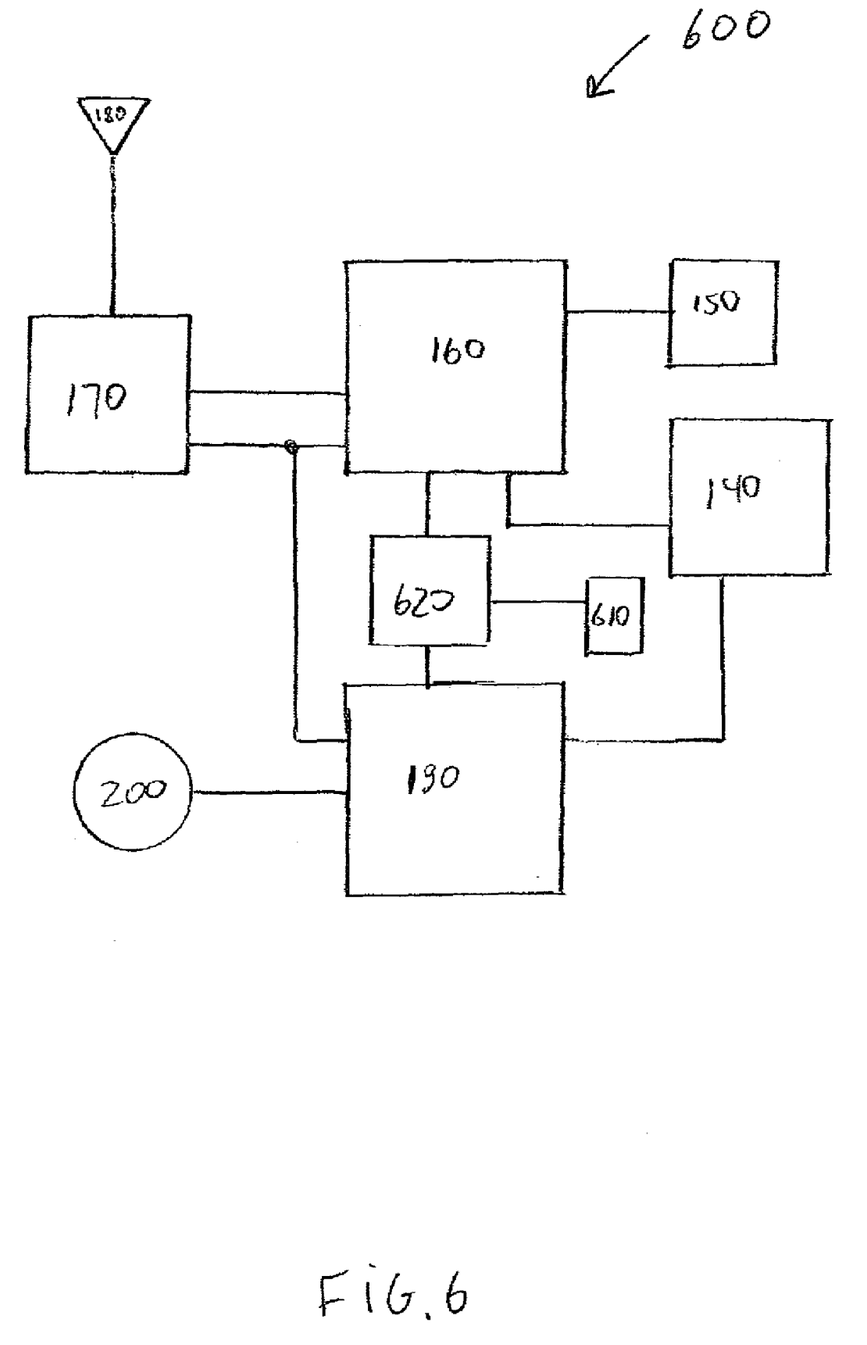
FIG. 6 is a simplified schematic diagram of a mouse with an energy conservation mode capability, in accordance with the present invention.
Figure 7:
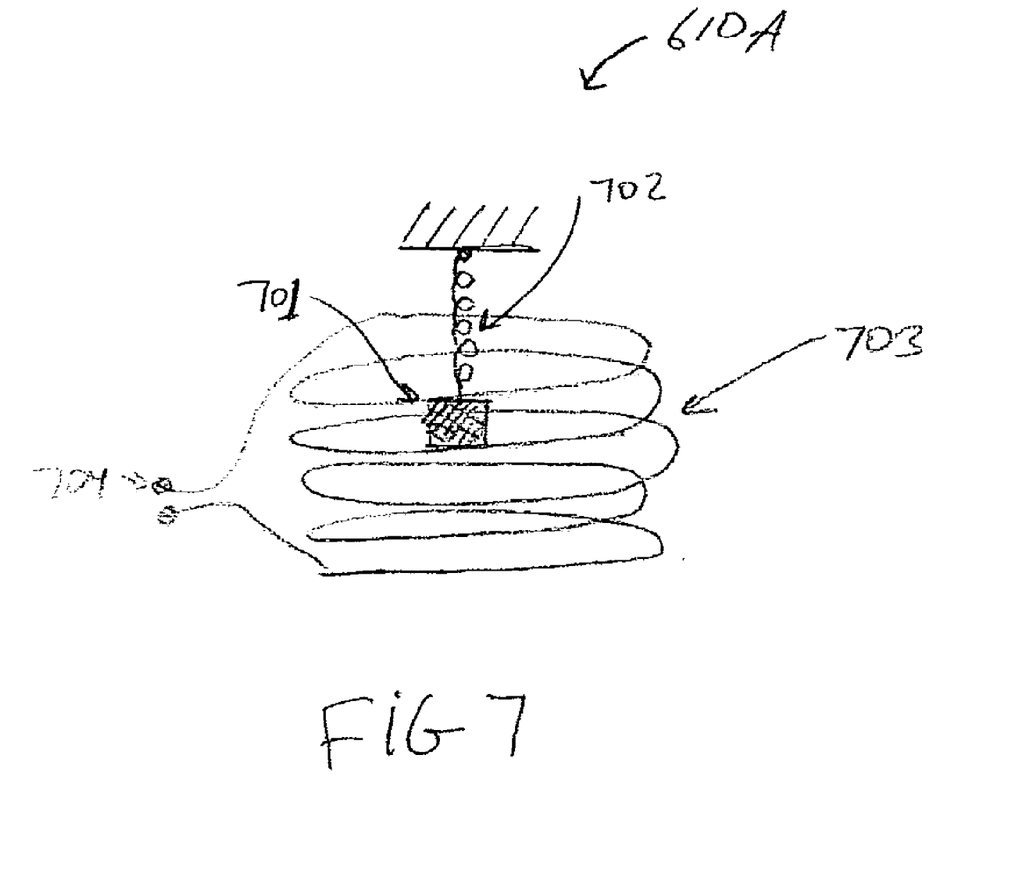
FIG. 7 illustrates portions of a activity detector for indicating movements of a mouse in accordance with the present invention.
Figure 8:
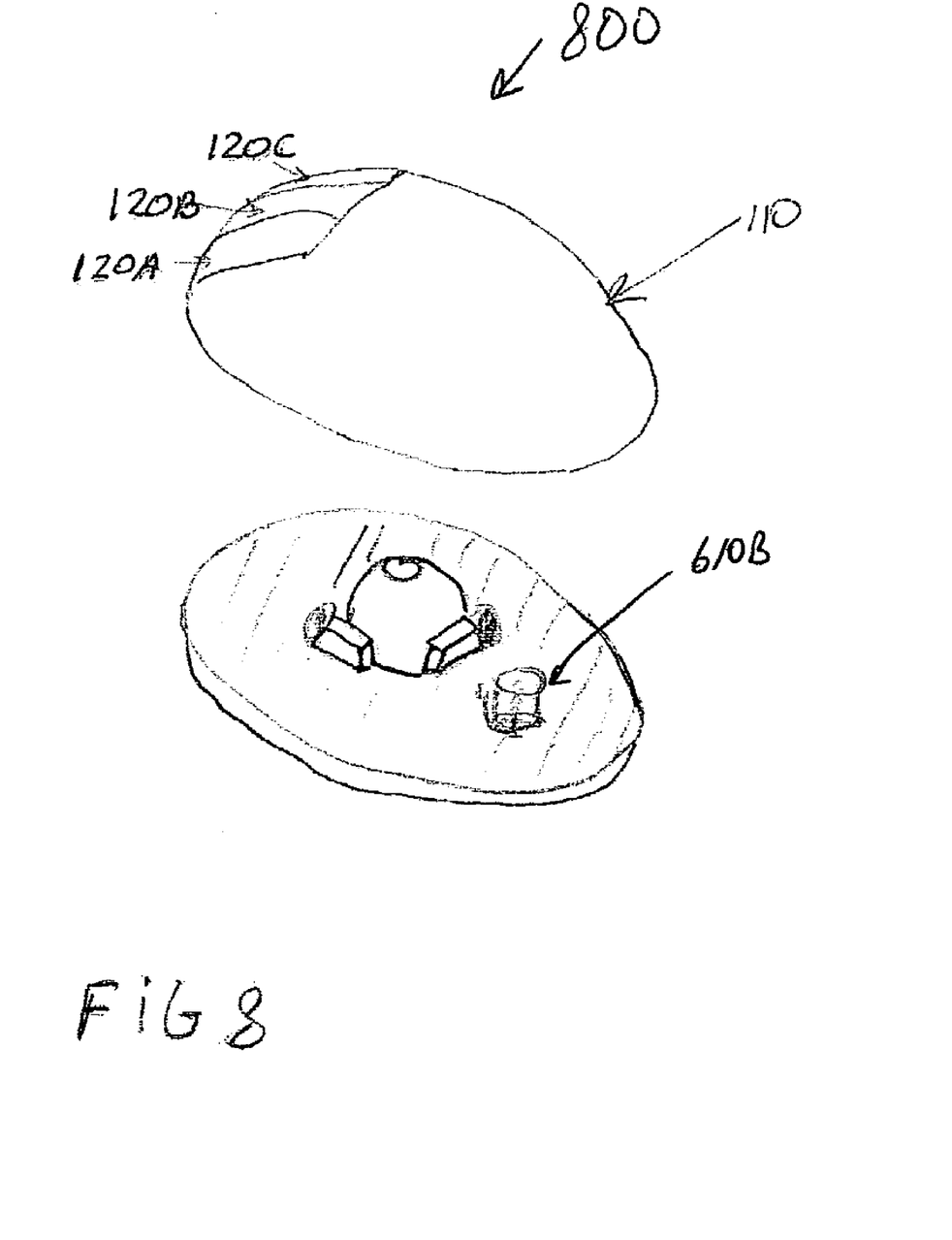
FIG. 8 is a perspective view of a mouse with a microswitch-based activity detector, in accordance with the present invention.

FIG. 6 is a simplified schematic diagram of a cordless mouse 600 with an energy conservation mode capability. As can be seen from the Figure, two blocks have been added. Numeral 610 designates an activity detector; it produces a signal indicating that the mouse is in use. In one embodiment, illustrated in FIG. 7, an activity detector 610A is similar to the integrated generator/kinetic energy converter described above. The activity detector 610A has a magnet 701 suspended moveably on a spring 702, within a fixed coil 703. When the mouse 600 is accelerated, the inertia of the magnet causes relative movement of the magnet 701 with respect to the coil 703, thereby generating electromotive force and a potential difference between terminals 704 of the coil 703. The potential difference serves as the signal indicating that the mouse is in use. In another embodiment, mouse 800 of FIG. 8, an activity detector 610B is a microswitch with a spring-loaded push button protruding slightly under the bottom of the mouse 800. The spring loading of the push button is such that the switch is in a first state when the mouse 600 alone rests on a pad; when additional weight is added to the mouse 800, for example, by placing a hand upon it, the switch changes its state. Empirical results indicate that spring loading of about 0.2 to about 3 ounces should work well for many people. In other words, the spring loading can be set so an addition of a weight between about 0.2 and about 3 ounces triggers the activity detector 610B.

Numeral 620 designates a state control mechanism that receives the signal generated by the activity detector 610 and, in turn, generates signals to the main controller 160 and, optionally, to the circuit 190, causing the mouse 600 to activate. At the same time, the state control mechanism 620 starts a preset internal timer. After the internal timer expires, the state control mechanism 620 either deactivates the mouse, i.e., turns it off, or puts it in a low power consumption state. The timer is restarted with receipt of each signal from the activity detector 610. Thus, if the mouse is in continuous use, the timer never expires.

The inventor herein believes that the appropriate setting for the timer is somewhere between about five seconds and about thirty minutes. In use, the setting from about two to about ten minutes provides a good compromise between cell energy conservation and user convenience.

The timer can be a simple one-shot, such as the ubiquitous 555 IC. The timer can also be implemented as an oscillator-counter combination. Other timer implementations will doubtless occur to those skilled in the art of electronic design.

Several methods are known for putting an electronic device into a low power consumption state. Initially, note that the power to many components can be turned off completely. For example, in an optical pointing device, the movement detector 140 is typically a rather power-hungry element. Thus, it can be turned off when it is not needed. Additionally, the transmitter block 170 can also consume substantial power, and turning it off during periods of inactivity also makes sense. As regards the main controller 160, if it is based on a microcontroller, it can be put in a sleep mode or state, instead of being turned off. An interrupt generated by the state control mechanism 620 would then awaken the main controller 160 when the signal from the activity detector 610 indicates resumption of the mouse's use. Indeed, two timers are employed in one embodiment of the state control mechanism 620: a first timer, with a relatively short time constant, and a second timer, with a longer time constant. The expiration of the first timer causes the microcontroller to switch to a sleep mode; the expiration of the second timer causes the mouse to be shut down completely. In practice, the time constant of the second timer can be advantageously set to be about three to about fifty times the value of the time constant of the first timer.

Figure 9:
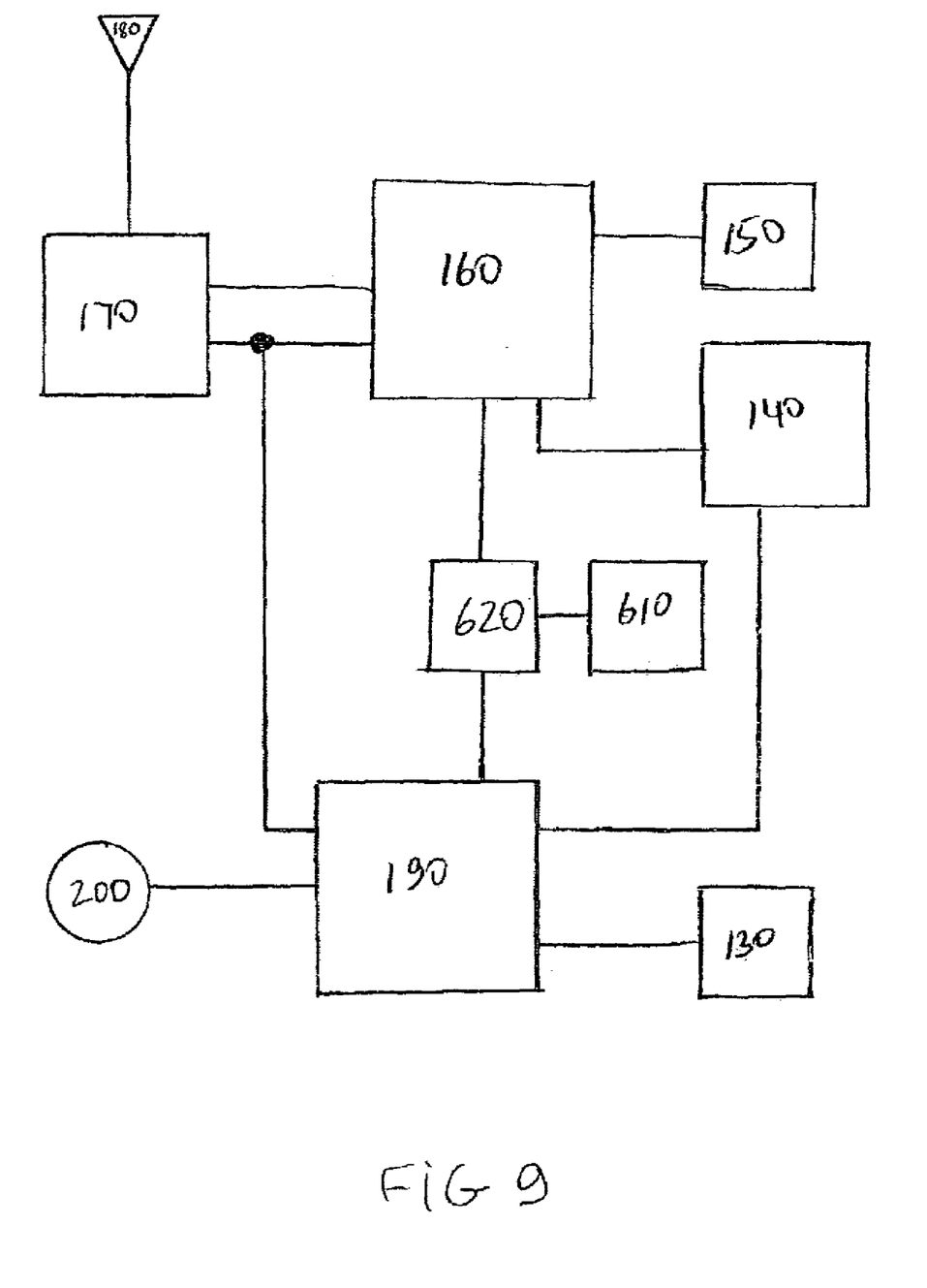
FIG. 9 is a simplified schematic diagram of a mouse with a photovoltaic element, an activity detector, and a state control mechanism, in accordance with the present invention.

As was briefly discussed above, the energy conservation scheme of the mouse 600 can be combined with the internal power generation schemes of, for example, the mice 100 or 300. FIG. 9 is a simplified schematic diagram of a wireless mouse with the photovoltaic element 130, the activity detector 610, and the state control mechanism 620.

All of the constituent blocks shown in FIG. 9 have been discussed above. It should be noted, however, that part or all of the power control and charging circuit 190 now stays on during periods of inactivity, to allow the current generated by the photovoltaic element 130 to recharge the cell 200 during such periods.

This document describes the inventive input and pointing devices and some of their features in considerable detail for illustration purposes only. Neither the specific embodiments of the invention as a whole, nor those of its features limit the general principles underlying the invention. In particular, the invention is not limited to mice, but includes trackballs, pens, joysticks, keyboards, and other pointing devices. The invention is also not limited to computer uses, but extends to all applications, particularly those involving special purpose data processing equipment. The specific features described herein may be used in some embodiments, but not in others, without departure from the spirit and scope of the invention as set forth. Various physical arrangements of components, various movement detectors, and various cells, including primary, secondary, and fuel, also fall within the intended scope of the invention. Furthermore, the nature of the link connecting a pointing device to its host need not limit the invention. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention, which function has been reserved for the following claims and their equivalents.

I claim:

1. A pointing device comprising:
   a) a movement detector producing electrical signals in response to manipulations of the pointing device, the electrical signals describing the manipulations;
   b) a controller coupled to the movement detector to receive electrical signals from the movement detector describing the manipulations, and to prepare the received signals for external wireless transmission;
   c) a fuel cell, supplying power for said controller and external wireless transmission; and
   an activity detector for indicating when the pointing device is in use, separate from said movement detector, said controller having a plurality of states representing different power consumption levels, a power consumption state of said controller being dependent on said activity detector.

2. A pointing device in accordance with claim 1, further comprising:
   a) an antenna; and
   b) a transmitter coupled to the controller to receive the prepared signals from the controller and to transmit the prepared signals to the host data processor through the antenna.

3. A pointing device in accordance with claim 2, wherein the transmitter comprises an RF transmitter.

4. A pointing device in accordance with claim 1, comprising an electromagnetic converter, said electromagnetic converter comprising a coil in said pointing device subjected to an external magnetic field, wherein a movement of the pointing device within the magnetic field generates electrical energy.

5. A pointing device in accordance with claim 1, further comprising:
   a) a switching assembly comprising at least one manually operable switch, each of the at least one switch being capable of assuming at least two states, the switching assembly being coupled to the controller so as to enable the controller to sense the states of the at least one switch.

6. A pointing device in accordance with claim 1, further comprising an RF transmitter for said external wireless transmission.

7. A pointing device in accordance with claim 1, further comprising an infrared transmitter for said wireless transmission.

8. A pointing device in accordance with claim 1, wherein the pointing device is a mouse.

9. A pointing device in accordance with claim 1, wherein the pointing device is a trackball.

10. A pointing device in accordance with claim 1, wherein the pointing device is a pen.

11. A pointing device in accordance with claim 1, wherein the pointing device is a joystick.

12. A pointing device in accordance with claim 1, comprising a photovoltaic cell.

13. A pointing device in accordance with claim 1, further comprising a power control circuit and a power storage element, wherein said power control circuit receives energy from said fuel cell and supplies a required portion to said controller, and supplies an excess portion to said power storage element or draws a deficient portion from said power storage element.

14. A pointing device in accordance with claim 1, wherein said controller comprises a programmable microcontroller.

15. A pointing device in accordance with claim 1, wherein the wireless transmission occurs through an ultrasound radiator.

16. A pointing device in accordance with claim 1, wherein the wireless transmission occurs through an optical radiator.

17. A pointing device in accordance with claim 1, wherein pointing device further comprises an electromagnetic generator which converts kinetic energy representing a movement of said pointing device into electrical power.

18. A pointing device in accordance with claim 1, wherein said fuel cell charges a capacitor.

19. A pointing device in accordance with claim 1, further comprising a rechargeable battery.

20. A pointing device in accordance with claim 1, wherein said controller receives external information wirelessly.

21. A pointing device in accordance with claim 1, wherein the pointing device comprises an electromagnetic converter, having a relatively moving magnet and coil internal thereto, producing an electrical signal in response to a movement.

22. A pointing device in accordance with claim 1, wherein the pointing device comprises an electromagnetic converter, having a coil, further comprising a mouse pad generating a magnetic field surrounding said coil when said pointing device is situated on said mouse pad.

23. A pointing device in accordance with claim 1, further comprising a pressure sensitive device providing an input to said controller.

24. A pointing device in accordance with claim 1, further comprising a flywheel.

25. A pointing device in accordance with claim 1, further comprising a pressure sensor, said pressure sensor controlling a power consumption mode of said pointing device between at least a low power consumption mode and a high power consumption mode.

26. A pointing device in accordance with claim 1, further comprising a flywheel coupled to a generator.

27. A pointing device in accordance with claim 1, wherein a power consumption state of said controller is further dependent on a timer.

28. A pointing device in accordance with claim 1, wherein said pointing device comprises a touchpad.

29. A pointing device in accordance with claim 1, wherein said pointing device communicates with a computer through a Universal Serial Bus port.

30. A pointing device in accordance with claim 1 wherein said pointing device communicates wirelessly with RF energy.

31. A pointing device in accordance with claim 1, wherein said movement detector consists essentially of a purely optical device.

32. A pointing device in accordance with claim 1, further comprising a primary battery.

33. A pointing device in bidirectional data communication with a host data processor, the pointing device comprising: a) a movement detector generating electrical signals in response to manipulations of the pointing device, the electrical signals describing the manipulations; b) a controller coupled to the movement detector to receive the electrical signals from the movement detector describing the manipulations, to prepare the received signals for wireless transmission to the host data processor, and wirelessly receive data from the host data processor, wherein said controller and a radio frequency circuit for bidirectional communication are combined on a single integrated circuit; c) a rechargeable power storage device, supplying power for operation to said controller; and d) a power generator to recharge said rechargeable power storage device, and to power said controller.

34. A pointing device in accordance with claim 33, wherein a communication from said pointing device to said host data processor communicates data for at least one of changing a sensitivity to movement, changing a velocity of a cursor, changing a function of manual input buttons, initiating self testing, performing rechargeable cell maintenance procedures, and reporting a status.

35. A pointing device in accordance with claim 33, wherein said wherein the power generator comprises a fuel cell.

36. A pointing device in accordance with claim 33, further comprising a switching assembly comprising one or more switches, each of the one or more switches being capable of assuming at least two states, the switching assembly being coupled to the controller so as to enable the controller to sense the states of the one or more switches, the controller generating clicking signals corresponding to the states of the one or more switches for wireless transmission to the host processor.

37. A pointing device in accordance with claim 33, further comprising an RF transmitter for transmitting data from the controller and the host data processor, and an RF receiver for receiving data from the host data processor.

38. A pointing device in accordance with claim 33, further comprising an infrared transmitter.

39. A pointing device in accordance with claim 33, wherein the pointing device is a device selected from the group consisting of a cordless mouse, a cordless trackball, cordless pen computer input device, a cordless joystick, a cordless computer tablet, and a cordless keyboard.

40. A pointing device in accordance with claim 33, wherein the power generator comprises a photovoltaic cell.

41. A pointing device in accordance with claim 33, wherein the power generator derives electrical energy from electromagnetic fields generated external to the pointing device.

42. A pointing device in accordance with claim 33, wherein the power generator derives electrical energy from kinetic energy of a movement of the pointing device.

43. A pointing device in accordance with claim 33, further comprising a pad, the pad comprising: a) a base; and b) a coil associated with the pad inductively coupled to a coil within said pointing device.

44. A pointing device in accordance with claim 33, further comprising a pad, packaged independent of the pointing device, comprising a plurality of embedded permanent magnets, the plurality of embedded permanent magnets emanating magnetic fields in space outside of the pad; wherein the power generator derives energy by movement of the pointing device through the magnetic fields emanated by the permanent magnets.

45. A pointing device in accordance with claim 33, further comprising:
a) an antenna; and
b) a wireless transmitter coupled to the controller to receive the prepared signals from the controller, the wireless transmitter being coupled to the antenna to send the prepared signals to the host data processor through the antenna;

wherein the rechargeable power source provides at least a portion of required electrical power for the wireless transmitter.

46. A pointing device being capable of entering a reduced power consumption state and a normal power consumption state, the pointing device comprising:
   a) a movement detector generating electrical signals in response to manipulations of the pointing device, the electrical signals describing the manipulations;
   b) a switching assembly comprising one or more switches, each of the one or more switches being capable of assuming at least two states;
   c) a main controller coupled to the movement detector and to the switching assembly, to receive the electrical signals describing the manipulations, to sense the states of the one or more switches, to prepare the electrical signals describing the manipulations for transmission to a host data processor, and to generate clicking signals corresponding to the states of the one or more switches;
   d) an antenna;
   e) a transmitter coupled to the main controller and to the antenna, to receive the prepared and clicking signals from the main controller and to send the prepared and clicking signals to the host data processor through the antenna;
   f) a secondary power cell receiving, storing, and releasing electrical energy;
   g) an activity detector that produces a wake-up signal when the pointing device is moved;
   h) a state control mechanism comprising a timer set to expire after a first period, the state control mechanism being capable of receiving the wake-up signal from the activity detector and starting the timer upon receipt of each wake-up signal, the state control mechanism being capable of causing the pointing device to be in the normal power state upon receipt of said each wake-up signal, the state control mechanism being capable of causing the pointing device to enter the reduced power state when the timer expires;
   i) a fuel cell for generating electrical energy; and
   j) a power controller coupled to the power cell and to the fuel cell, to receive the generated electrical energy and recharge the secondary power cell.

47. A method of operating a wireless pointing device, the method comprising the steps of:
   a) detecting an activity of the pointing device, indicating when the pointing device is in use;
   b) detecting a movement of the pointing device, representing user manipulation of the pointing device, separate from said detecting an activity;
   c) wirelessly transmitting signals from the pointing device describing the manipulations;
   d) providing means for converting a fuel into electrical energy to generate electrical power in the pointing device; and
   e) selecting one of a plurality of states to enter into, each state having a respectively different power consumption level, a selection of state to enter into being dependent on said detecting of activity.

48. A method of operating a wireless pointing device comprising the steps of: a) providing a pointing device; b) providing a fuel cell for generating electrical power in the pointing device; c) providing a temporary power storage element within the pointing device; and d) providing a circuit for charging the temporary power storage element with the electrical power generated by the fuel cell, wherein said temporary power storage element supplies a required electrical power to said pointing device, an excess electrical power being accumulated in said temporary storage element.

49. A method of operating a wireless pointing device comprising the steps of:
   a) providing a movement sensor, producing a movement output representing a movement of the pointing device;
   b) providing an activity sensor producing an activity output indicative of an activity of the pointing device;
   c) providing a controller, receiving the activity output and the movement output, and transmitting a signal wirelessly representing the movement during periods of activity, wherein the transmitting consumes power;
   d) providing a fuel cell which produces electrical energy from a fuel;
   e) activating the pointing device;
   f) moving the pointing device;
   g) wirelessly transmitting the signal; and
   h) ceasing the wireless transmitting to reduce power consumption.

50. A method of operating a wireless pointing device in accordance with claims 47, 48 or 49 wherein said wireless pointing device is a computer mouse, a computer trackball, a computer pen, a computer tablet or a computer joystick.

51. A hand-manipulated cordless computer input pointing device, comprising:
   a housing;
   at least one pressure-sensitive element for receiving a manual input;
   an electrooptical sensor, for quantitatively sensing a movement of the housing;
   an activity detector, for determining an activity of a user of the pointing device;
   a processor, receiving inputs from the activity detector, at least one pressure-sensitive element, and the sensor, and selectively activating the sensor and producing a digital output stream representing the received inputs for a period after the activity detector detects activity;
   a wireless transmitter, transmitting the produced digital output stream remotely from the housing;
   a fuel cell power source, having a peak power output insufficient to fully operably power the processor and sensor during activity; and
   a power storage element, storing power from the power source during periods of inactivity, such that during normal activity, at least the processor and optical sensor receive sufficient power for operation.

52. The hand-manipulated cordless computer input pointing device according to claim 51, further comprising a photovoltaic element.

53. The hand-manipulated cordless computer input pointing device according to claim 51, further comprising a receiver for receiving information from a host data processor wirelessly.

54. The hand-manipulated cordless computer input pointing device according to claim 51, wherein the at least one pressure-sensitive element comprises at least one switch.

55. A pointing device in bidirectional data communication with a host data processor, and being capable of entering a reduced power consumption state and a normal power consumption state, the pointing device comprising:
   a) a movement detector generating electrical signals in response to manipulations of the pointing device, the electrical signals describing the manipulations;
   b) a switching assembly comprising one or more switches, each of the one or more switches being capable of assuming at least two states;

c) a main controller coupled to the movement detector and to the switching assembly, to receive the electrical signals describing the manipulations, to sense the states of the one or more switches, to prepare the electrical signals describing the manipulations for transmission to a host data processor, and to generate clicking signals corresponding to the states of the one or more switches;

d) an antenna;

e) a transmitter coupled to the main controller and to the antenna, to receive the prepared and clicking signals from the main controller and to send the prepared and clicking signals to the host data processor through the antenna, and to receive data from the host data processor, wherein the main controller and a radio frequency circuit for bidirectional communication are combined on a single integrated circuit;

f) a secondary power cell receiving, storing, and releasing electrical energy;

g) an activity detector that produces a wake-up signal when the pointing device is moved;

h) a state control mechanism comprising a timer set to expire after a first period, the state control mechanism being capable of receiving the wake-up signal from the activity detector and staffing the timer upon receipt of each wake-up signal, the state control mechanism being capable of causing the pointing device to be in the normal power state upon receipt of said each wake-up signal, the state control mechanism being capable of causing the pointing device to enter the reduced power state when the timer expires;

i) power generator for generating electrical energy; and j) a power controller coupled to the power cell and to the power generator, to receive the generated electrical energy and recharge the secondary power cell.

56. The hand-manipulated cordless computer input pointing device according to any of claims 33, 45, 46, 51, 52, 53, 54, or 55, wherein the cordless pointing device serves as a mouse, a trackball, a pen, a tablet, keyboard, or a joystick.

57. A pointing device in accordance with claim 55, wherein the power generator comprises a photovoltaic element.

58. A pointing device in accordance with claim 55, wherein the power generator comprises a kinetic energy converter, converting kinetic energy derived from a movement of the pointing device into electrical energy.

59. A pointing device in accordance with claim 55, wherein the power generator comprises means for inducing varying magnetic field in a coil, means for inductively coupling the induced varying magnetic field to the coil in the pointing device, and means for generating DC power in the pointing device from the inductively coupled varying magnetic field.

60. A pointing device in bidirectional data communication with a host data processor, the pointing device comprising:

a) a movement detector generating electrical signals in response to manipulations of the pointing device, the electrical signals describing the manipulations;

b) a controller coupled to the movement detector to receive the electrical signals from the movement detector describing the manipulations, to prepare the received signals for wireless transmission to the host data processor, and wirelessly receive data from the host data processor;

c) a rechargeable power storage device, supplying power for operation to said controller;

d) a power generator to recharge said rechargeable power storage device, and to power said controller;

e) an antenna; and f) a wireless transmitter coupled to the controller to receive the prepared signals from the controller, the wireless transmitter being coupled to the antenna to send the prepared signals to the host data processor through the antenna;

wherein the rechargeable power source provides at least a portion of required electrical power for the wireless transmitter.

* * * * *